(12) United States Patent
Taylor et al.

(10) Patent No.: US 8,302,831 B2
(45) Date of Patent: Nov. 6, 2012

(54) FLANGED FUEL CELL AND LOCATING STRUCTURE FOR COMBUSTION TOOL

(75) Inventors: Walter J. Taylor, Mchenry, IL (US); Maureen L. Shea, Wilmette, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2 days.

(21) Appl. No.: 12/759,340

(22) Filed: Apr. 13, 2010

(65) Prior Publication Data

US 2011/0248063 A1   Oct. 13, 2011

(51) Int. Cl.
*B25C 1/12* (2006.01)
*F16L 37/04* (2006.01)
(52) U.S. Cl. .................. 227/9; 227/10; 227/130
(58) Field of Classification Search .......... 227/9, 10, 227/11; 123/495, 46 R
See application file for complete search history.

(56) References Cited

U.S. PATENT DOCUMENTS

| | | | |
|---|---|---|---|
| 3,035,617 A * | 5/1962 | Breitenstein | 141/349 |
| 3,884,256 A * | 5/1975 | Corlet | 137/322 |
| 4,403,722 A | 9/1983 | Nikolich | |
| 4,483,473 A | 11/1984 | Wagdy | |
| 4,483,474 A | 11/1984 | Nikolich | |
| 4,522,162 A | 6/1985 | Nikolich | |
| 5,115,944 A | 5/1992 | Nikolich | |
| 5,263,439 A | 11/1993 | Doherty et al. | |
| 5,484,088 A * | 1/1996 | Martin | 222/402.2 |
| 6,145,724 A | 11/2000 | Shkolnikov et al. | |
| 6,302,297 B1 | 10/2001 | Richardson et al. | |
| 6,679,414 B2 | 1/2004 | Rotharmel | |
| 6,796,478 B2 * | 9/2004 | Shkolnikov et al. | 227/10 |
| 7,296,719 B1 * | 11/2007 | Taylor et al. | 227/10 |
| 7,392,922 B2 | 7/2008 | Vanstaan et al. | |
| 7,445,136 B2 * | 11/2008 | Lin | 222/402.1 |
| 7,478,740 B2 | 1/2009 | Shea | |
| 7,546,938 B2 * | 6/2009 | Panasik et al. | 227/10 |
| 7,571,841 B2 * | 8/2009 | Gibson et al. | 227/10 |
| 7,591,249 B2 * | 9/2009 | Wagdy et al. | 123/495 |
| 7,654,429 B2 | 2/2010 | Shea | |
| 7,841,499 B2 * | 11/2010 | Ho | 227/10 |
| 7,841,500 B2 * | 11/2010 | Ho | 227/10 |
| 2003/0127488 A1 * | 7/2003 | Wagdy | 227/9 |
| 2008/0110953 A1 * | 5/2008 | Gibson et al. | 227/10 |
| 2008/0166600 A1 * | 7/2008 | Tanaka | 429/13 |
| 2010/0096429 A1 * | 4/2010 | Ho | 227/130 |

* cited by examiner

*Primary Examiner* — Lindsay Low
(74) *Attorney, Agent, or Firm* — Greer, Burns & Crain, Ltd.; Patty Chidiac; Mark W. Croll (57) ABSTRACT

A fuel cell is provided and is constructed and arranged for use with a combustion tool including a cylinder head frame. The fuel cell includes an outer shell having a closed lower end and an open upper end, and a closure crimped over the upper end and defining an opening for accommodating a reciprocating valve stem. An adapter frictionally engages the closure and includes a flange configured for suspending the fuel cell in the fuel cell chamber.

15 Claims, 6 Drawing Sheets

FLANGED FUEL CELL AND LOCATING STRUCTURE FOR COMBUSTION TOOL

BACKGROUND

The present invention relates generally to improvements in fuel cell fuel delivery arrangements for use in combustion tools, and more specifically to adapters provided to combustion tool fuel cells for obtaining more consistent fuel dosing.

In the present application the term "combustion tool" refers to combustion powered fastener driving tools, also known as combustion nailers, cordless framing tools, cordless trim tools and the like. More particularly, the present invention relates to improvements in the delivery of fuel from fuel cells customarily provided for such purposes.

Such tools typically have a housing substantially enclosing a combustion power source, a fuel cell, a battery, a trigger mechanism and a magazine storing a supply of fasteners for sequential driving. The power source includes a reciprocating driver blade which separates a forward most fastener from the magazine and drives it through a nosepiece into the workpiece. Exemplary tools are described in U.S. Pat. Nos. 4,483,473; 4,522,162; 6,145,724; and 6,679,414, all of which are incorporated by reference. Such fastener-driving tools and such fuel cells are available commercially from ITW-Paslode (a division of Illinois Tool Works, Inc.) of Vernon Hills, Ill., under its IMPULSE trademark.

As exemplified in Nikolich U.S. Pat. Nos. 4,403,722; 4,483,474; and 5,115,944, all of which are also incorporated by reference, it is known to use a dispenser such as a fuel cell to dispense a hydrocarbon fuel to a combustion tool. A design criterion of such fuel cells is that only a desired amount of fuel or dose of fuel should be emitted by the fuel cell for each combustion event. The amount of fuel should be carefully monitored to provide the desired combustion, yet in a fuel-efficient manner to prolong the working life of the fuel cell.

Prior attempts to address this dosage factor have resulted in fuel metering valves located in the tool (U.S. Pat. No. 5,263,439) or attached to the fuel cell (U.S. Pat. No. 6,302,297), both of which are also incorporated by reference. Fuel cells have been introduced having internal metering valves, as disclosed in U.S. Pat. No. 7,392,922, also incorporated by reference.

Regardless of the location of the metering valve, the associated combustion nailer is designed to exert a force on the valve, either the reciprocating valve stem or on the valve body itself, to cause the stem to retract against a biasing force in the metering valve to dispense a measured dose of fuel. It is important for fuel economy in the fuel cell, and for desired operation of the combustion nailer, for only the designated amount of fuel to be supplied to the tool on a dosage basis.

However, variations in manufacturing tolerances often result in a tolerance "stack up" which under some circumstances can interfere with the designed connection between the fuel cell and the tool, as well as the fuel actuation mechanism of the tool, which depresses the fuel cell valve stem before each combustion cycle to obtain the desired fuel dosage for combustion. Thus, there is a need for a combustion tool which provides for consistent fuel delivery while accommodating the tolerance stack up inherent in combustion tool manufacturing.

SUMMARY

The above-identified manufacturing problem of tolerance stack up is addressed in the present combustion tool fuel cell and associated tool. To more accurately maintain the relationship between the fuel cell metering valve stem and the corresponding actuation mechanism on the tool, the fuel cell is suspended from arms on the cylinder head, rather than resting on a floor in the fuel cell chamber of the tool housing. This results in a more consistent relationship between the fuel cell and the corresponding tool actuator mechanism.

In addition, an upper end of the fuel cell adapter is provided with a vertically projecting cylindrical formation that forms a face seal with a corresponding receiving portion of a stem receiver block. This improved construction results in a more positive seal that accommodates the above-described tolerance stack up, as well as the severe shock impacts inherent in normal combustion tool operation.

More specifically, a fuel cell is provided and is constructed and arranged for use with a combustion tool including a cylinder head frame. The fuel cell includes an outer shell having a closed lower end and an open upper end, and a closure crimped over the upper end and defining an opening for accommodating a reciprocating valve stem. An adapter frictionally engages the closure and includes a flange configured for suspending the fuel cell in the fuel cell chamber.

In another embodiment, a combustion tool is provided, including a housing enclosing a combustion power source including a cylinder head, the cylinder head provided with a frame having a pair of spaced, parallel arms defining between them a fuel cell chamber with a floor defined by the housing, each of the arms defining a locating shelf on an inside surface. A fuel cell is configured for removable insertion into the fuel cell chamber and has an adapter, the adapter including a flange configured for engaging the locating shelf for suspending the fuel cell in the fuel cell chamber so that a bottom of the fuel cell is free of the floor.

In still another embodiment, a combustion tool is provided, including a housing enclosing a combustion power source including a cylinder head, the cylinder head defining a combustion chamber. A fuel cell is configured for removable insertion into the fuel cell chamber and has an adapter. A fuel line is in communication with the combustion chamber and has a free end connected to a stem receiver block having an internal passageway. The adapter is configured for connection to the stem receiver block and includes a hub configured for matingly engaging the block, and having a cylindrical extension projecting from an upper end for forming a face seal with the stem receiver block.

DETAILED DESCRIPTION

Figure 1:
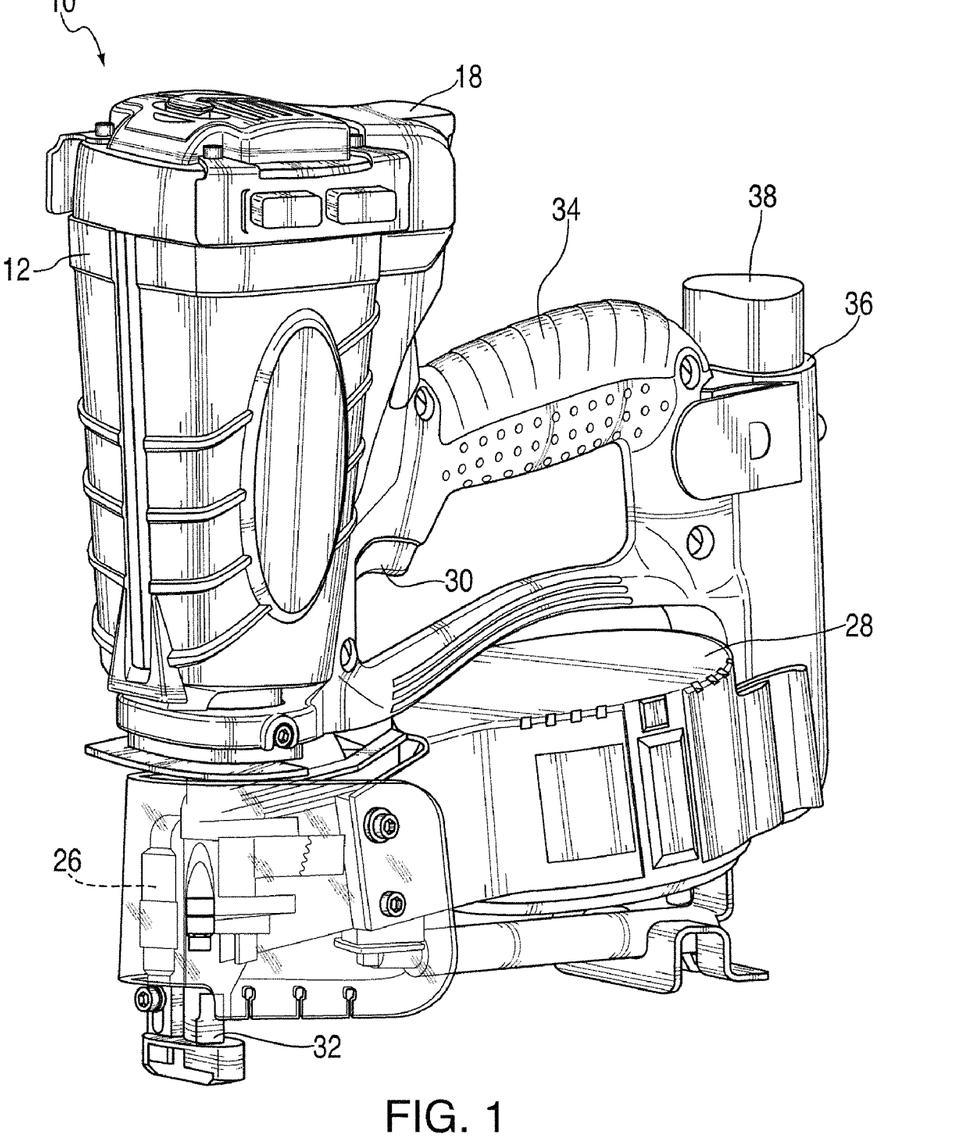
FIG. 1 is a front perspective view of a combustion tool equipped with the present fuel cell locating system.
Figure 2:
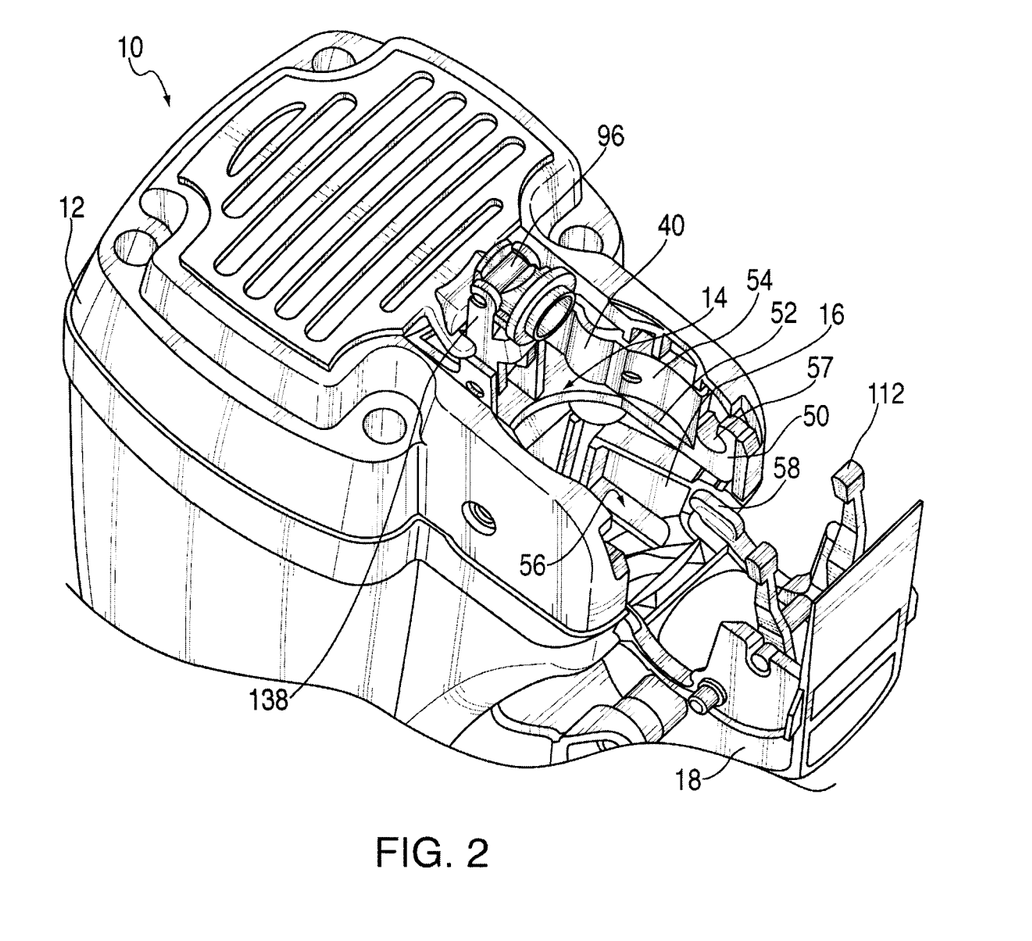
FIG. 2 is a fragmentary top perspective view of the tool of FIG. 1 showing the fuel cell door opened for receiving a fuel cell.
Figure 3:
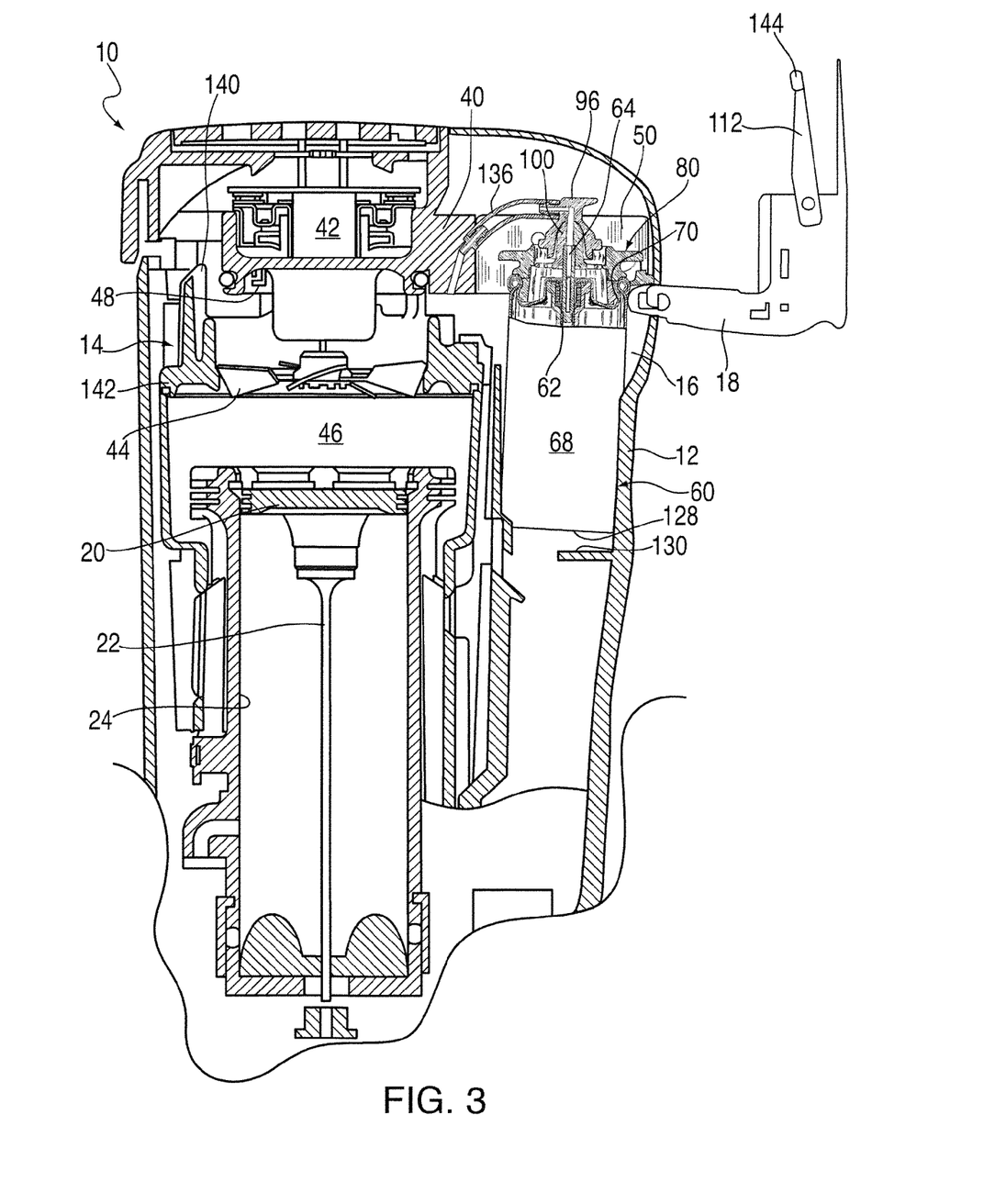
FIG. 3 is a fragmentary vertical section of the tool of FIG. 2.

Referring now to FIGS. 1-3, a combustion nailer is depicted, generally designated 10. As is known in the art, a main tool housing 12 encloses a power source 14 and a fuel cell chamber 16. A fuel cell door 18 is pivotally engaged on the housing 12 and is configured to close off the fuel cell chamber 16 during tool operation. The construction and arrangement of such doors 18 is well known in the art.

The power source 14 includes a reciprocating piston 20 (FIG. 3) having a driver blade 22 secured thereto for common movement relative to the power source and within a cylinder 24. A nosepiece 26 (FIG. 1) is secured to a lower end of the power source 14 as is known in the art and provides an attachment point for a fastener magazine 28, here shown as a coil magazine, however other types of magazines such as strip magazines are considered suitable. Fasteners are fed sequentially from the magazine 28 into the nosepiece 26 where they are engaged by the driver blade 22 traveling down a fastener passageway in the nosepiece.

The fasteners are driven into a workpiece or substrate after initiation of a power cycle, initiated in some tools by the operator actuating a trigger 30. A workpiece contact element 32 reciprocates relative to the nosepiece 26 to control tool functions as is known in the art, but is not relevant to the present discussion.

Also provided to the housing 12 is a handle 34 which serves as the mounting point for the trigger 30. A battery chamber 36 (FIG. 1) is also provided to the housing 12 for accommodating at least one battery 38 for powering electronic tool functions such as spark generation, cooling fan operation, electronic fuel injection and/or tool condition sensing as known in the art.

Figure 4:
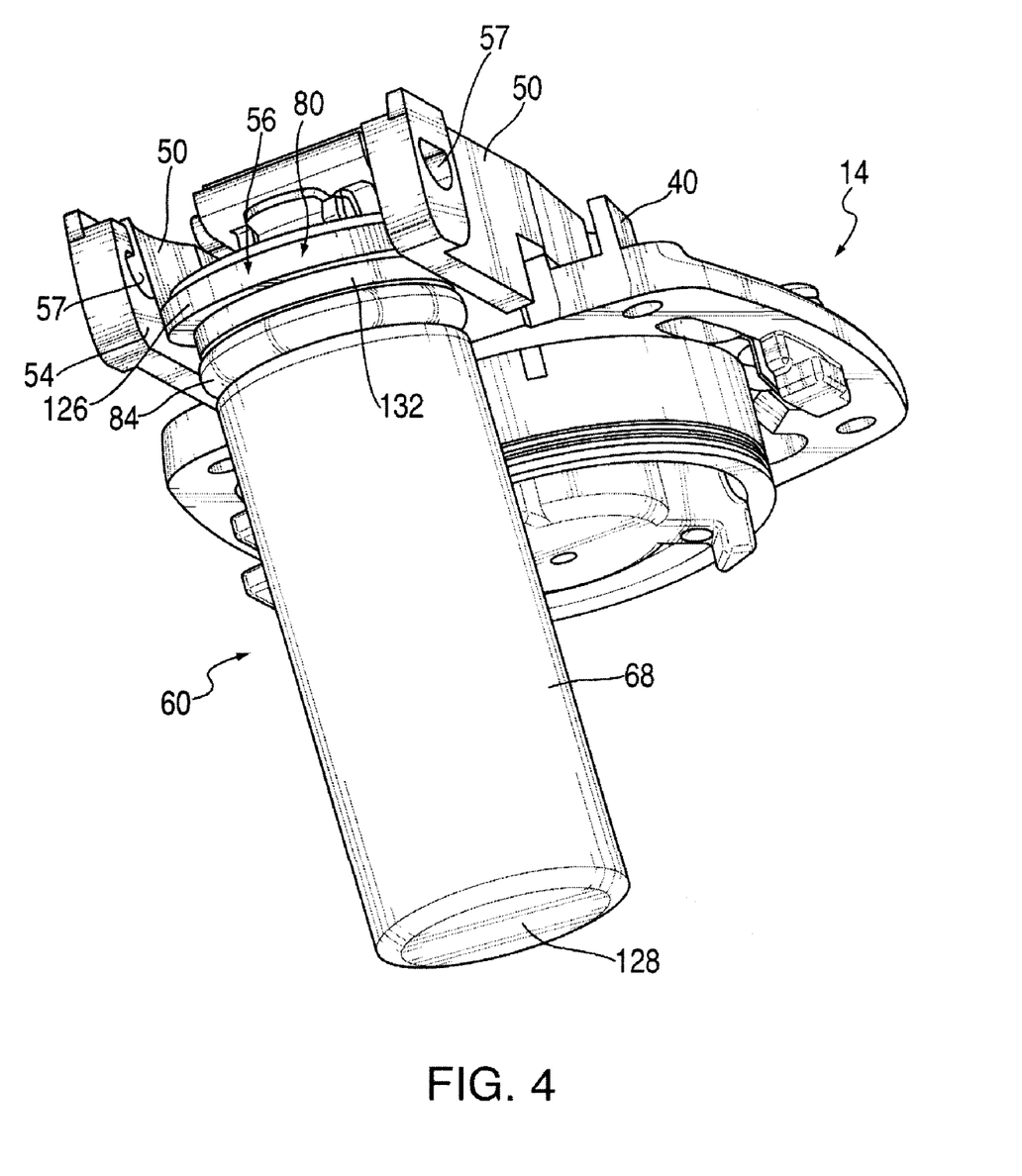
FIG. 4 is a bottom perspective view of the present fuel cell provided with a locating flange for suspended engagement from the combustion chamber frame.

Referring now to FIGS. 2-4, an upper end of the power source 14 is defined by a cylinder head 40, serving as the mounting point for a fan motor 42 powering a fan 44 projecting into a combustion chamber 46, and also being the mounting point for a spark generator or spark plug 48. Also included on the cylinder head 40 are two spaced, parallel arms 50 forming a cylinder head frame, each having a recessed shelf 52 defined on an inner surface 54 (FIG. 2). A space 56 between the inner surfaces 54 defines an entrance to the fuel cell chamber 16. The entrance 56 is considered part of the fuel cell chamber 16. Ends of the arms 50 have pivot openings 57 for receiving corresponding lugs 58 of the fuel cell door 18.

Referring now to FIGS. 3-6, as described in U.S. Pat. No. 5,263,439, incorporated by reference, inserted into the fuel cell chamber 16 is a fuel cell, generally designated 60, the general construction of which is well known in the art pertaining to combustion tools, and which is configured for removable engagement in the fuel cell chamber 16. The particular construction of the present fuel cell 60, having an internal fuel metering valve 62 (FIGS. 3 and 6) is described in copending U.S. Pat. No. 7,392,922 which has been incorporated by reference. Generally speaking, a fuel valve stem 64 is biased to a closed position, as by a spring (not shown), but when axially depressed, a measured dose of fuel is dispensed. Upon withdrawal of the axial force, the stem 64 resumes its rest position, and a subsequent dose of fuel flows into a metering chamber 66 for the next firing cycle.

Other major components of the fuel cell 60 include a generally cylindrical, close bottomed outer shell 68, and a closure 70 crimped over an open upper end 72 of the shell. Included on the closure is an opening 74 for accommodating the reciprocating valve stem 64.

Figure 5:
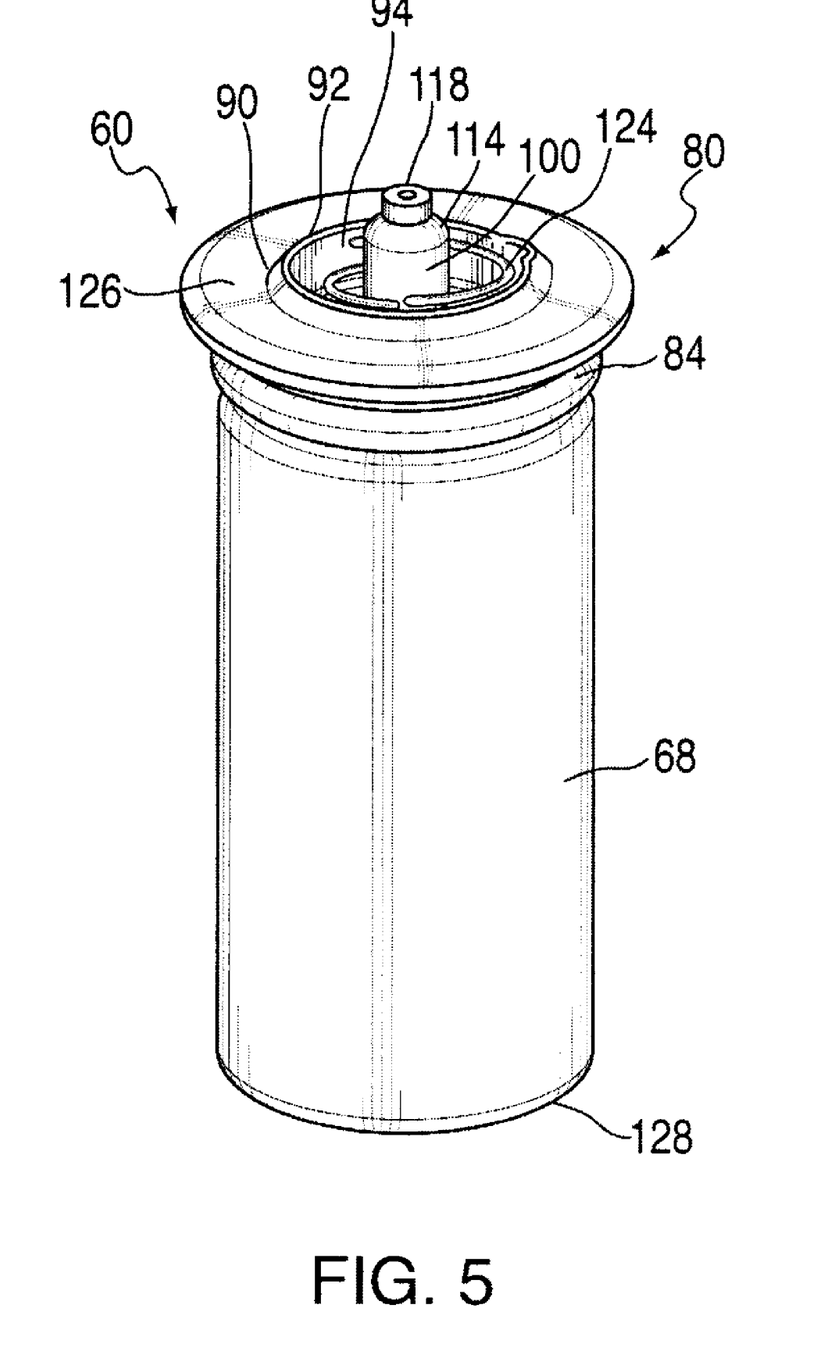
FIG. 5 is a top perspective view of the present fuel cell equipped with the present locating flange adapter.
Figure 6:
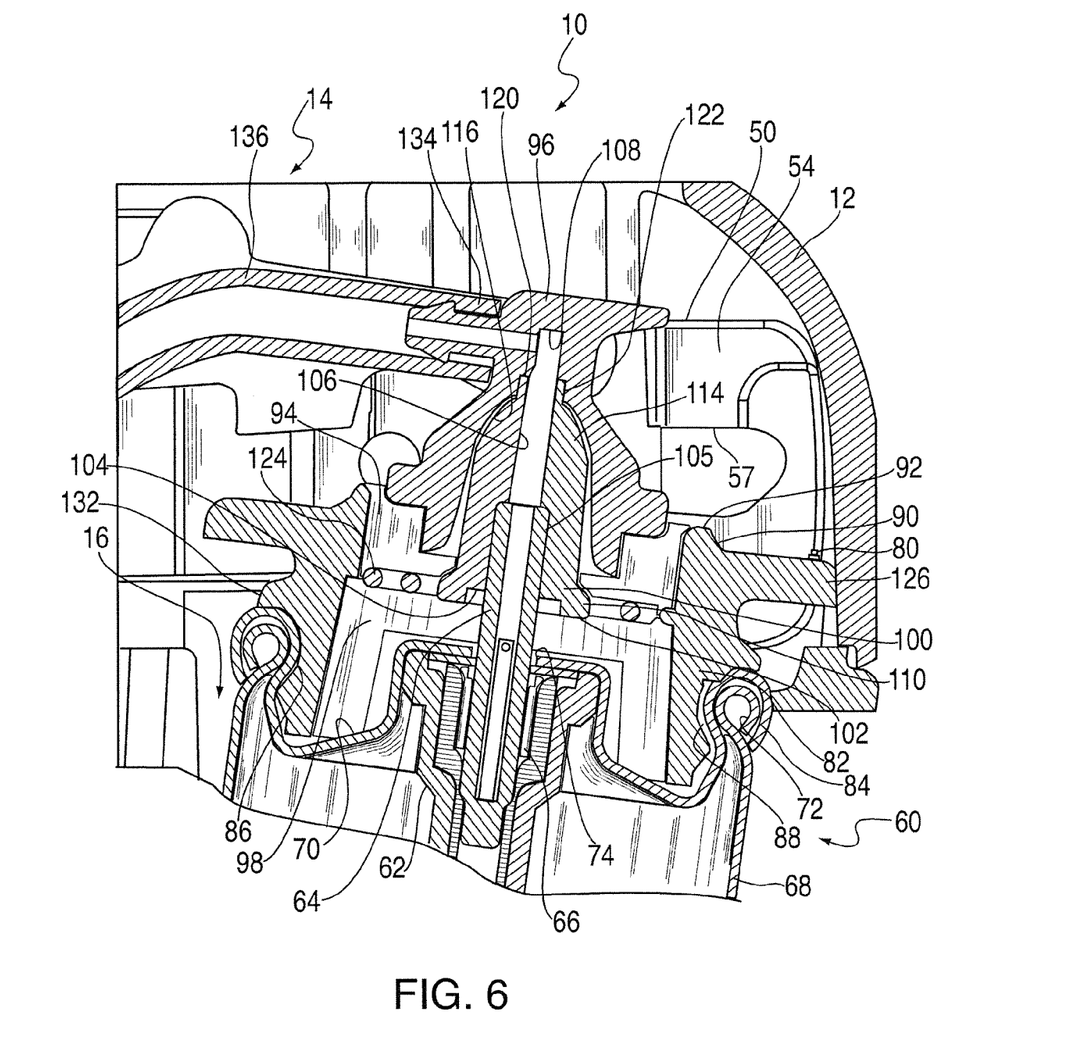
FIG. 6 is a fragmentary vertical section of the present fuel cell connected to the present combustion tool.

Referring now to FIGS. 4-6, an important feature of the present fuel cell 60 is an adapter, generally designated 80. A main portion of the adapter 80 is the adapter body 82 which is generally cylindrical in shape and is dimensioned to fit snugly within an annular peripheral ring 84 formed by the fuel cell closure 70. A tight friction fit of the adapter 80 with the closure 70 is enhanced by at least one radially extending gripping formation 86, which defines an annular groove 88 for tightly engaging the ring 84. The formation 86 can be provided in a single closed ring or a series of spaced protrusions.

To reduce the possibility of a user accidentally using a fuel cell not equipped with an internal metering valve 62, the adapter 80 is designed to be extremely difficult to remove from the closure 70. This is accomplished by dimensioning the gripping formation 86 and the groove 88 to have an extremely tight friction fit with the closure 70. In addition, in that the adapter 80 is preferably molded of a plastic material, a material is selected for stiffness, as well as for fuel resistance, moldability and durability. It is contemplated that acetyl, commonly sold under the trademark Celcon.® by Hoechst Celanese, Charlotte N.C., is a preferred material, however other acetyls, polyamids or other fuel resistant plastics may be suitable.

An upper portion 90 of the adapter body 82 defines a locator ring 92 with an open upper end 94 for receiving a stem receiver block 96 (FIG. 6). An inner chamber 98 is defined in the adapter 80 by the body 82 and is provided with a hub 100 which is reciprocally movable relative to the adapter body and has a first, lower end 102 configured for operationally, engaging and being in fluid communication with the valve stem 64, and having a larger diameter internal bore 104 in communication with a fuel throughbore 106. The internal bore 104 has a chamber 105 dimensioned for tightly and slidingly receiving the valve stem 64. Also, the fuel throughbore 106 is in fluid communication with the valve stem 64 as well as an internal passageway 108 in the stem receiver block 96.

Also on the first hub end 102 is an annular foot 110 which acts as a stop against the fuel cell closure 70. This stop is important in restricting the amount of depression of the valve stem 64 through operation of an actuator 112 on the fuel cell door 18 or other vertical force. Excessive depression of the stem 64 may cause more than the predetermined dose of fuel to be dispensed and should be avoided.

A second, upper, generally bullet-shaped end 114 of the hub 100 opposite the first end 102 is configured for engaging and being in sealed fluid communication with the stem receiver block 96. Preferably, the second end 114 of the hub 100 and a hub cavity 116 in the block 96 are complementarily shaped to have a tight friction fit. This tight fit facilitates physical connection between the hub 100 and the block 96 and maintains a sealing relationship to prevent fuel leakage. Further details of the stem receiver block 96 and the hub 100 and other portions of the adapter 80 are described in U.S. Pat. No. 7,654,429 which is incorporated by reference.

In addition to this complementary, mating fit, it is preferred that the second hub end 114 is provided with a tubular cylindrical extension or projection 118 creating a face seal with an upper, planar end 120 of the hub cavity 116. This face seal provides sufficient complementary surface area between the hub 100 and the stem receiver block 96 for providing a positive sealing relationship. In addition, the projection 118 has a sufficient axial length with fairly close tolerances with a cylindrical locating recess 122 to keep the face seal square.

A feature of the adapter 80 is that the hub 100 is reciprocally movable relative to the body 82 so that the hub can follow the cyclical movement of the valve stem 64. Thus, the hub 100 accommodates the motion induced into the system by the actuator 112, as well as by the spring in the fuel cell 60. In the preferred embodiment, the reciprocal movement is provided by at least one curved flexible member 124 which is secured at a first end to the adapter body 82 and at an opposite end to the hub 100. The flexible members 124 are designed to add only a negligible force to that required to depress the fuel valve stem 64 in the fuel cell 60. In construction, the flexible members 124 are spiral in shape and have a generally circular cross-section to enhance the flexibility while reducing torsional stiffness.

There are preferably three curved flexible members 124, and they basically suspend the hub 100 relative to the body 82. In addition to the suspending function, the flexible members 124 bias the hub 100 to a rest position shown in FIG. 6.

Referring again to FIGS. 4-6, the adapter body 82 is also provided with a flange 126 configured for engaging the locating shelves 52 for suspending the fuel cell 60 in the fuel cell chamber 16. It will be seen that the generally planar flange 126 defines a circular, disk shape and extends beyond an exterior of the fuel cell outer shell 68. In fact, the flange 126 is dimensioned so that once engaged in the locating shelves 52, it is the sole support for the fuel cell 60 in the fuel cell chamber 16. More specifically, once suspended on the shelves 52, a bottom 128 of the fuel cell 60 is disposed above and free of a floor 130 of the fuel cell chamber 16 (FIG. 3). While the particular engagement of the flange 126 on the shelves 52 is described here, it will be appreciated that the adapter 80 may be provided with alternate structures configured for suspending the fuel cell 60 from the cylinder head 40.

Preferably, the flange 126 is generally coplanar with the hub 100 and extends radially from the upper portion 90 of the adapter 80, between the axially extending actuator ring 92 and a generally central lip 132 which radially extends from the adapter body 82 and rests upon the closure peripheral ring 84. More preferably, the flange 126 is located between the actuator ring 92 and the curved flexible member 124.

Referring now to FIGS. 2, 3 and 6, the stem receiver block 96 is connected to a free end 134 of a fuel line 136, the opposite end of which is in fluid communication with the combustion chamber 46. As is known in the art, to dispense a dose of fuel from the fuel cell 60 through the fuel line 136, a fuel cell actuator assembly is provided and is generally designated 138 which is in operational relationship with fuel cell chamber 16 and is constructed and arranged for exerting an axial force on the valve stem 64. A main component of the actuator 138 is the generally elongate actuator element 112 configured for exerting an axial force on the stem 64, releasing the dose of fuel. In the preferred embodiment, the element 112 is associated with the fuel cell door 18 and is in actual contact with the stem receiver block 96.

As seen in FIG. 3, the fuel cell door 18 is pivotally engaged with the pivot points 57 on the cylinder head arms 50. As is well known in the combustion tool art, vertical projections 140 on the reciprocating valve sleeve 142 (which largely defines the combustion chamber 46) engage ends 144 of the actuator element 112 and cause it to rock relative to the fuel cell door 18, thus exerting the periodic axial force on the stem receiver block 96, which in turn axially depresses the valve stem 64. Once the tool 10 is pressed against a workpiece and the workpiece contact element 32 is retracted relative to the cylinder 24, ultimately causing the depression of the valve stem 64, releasing a dose of fuel into the combustion chamber 46 and a resulting combustion or firing of the tool 10.

Thus, it will be seen that the present fuel cell 60, equipped with the present adapter 80 is more suitable for manufacturing than prior designs, in that tolerance stack up is no longer an issue in maintaining a positive sealing engagement between the fuel cell valve stem 64 and the stem receiver block 96. Also, by suspending the fuel cell 60 from the cylinder head arms 50, a more constant positioning of the fuel cell is obtained.

While a particular embodiment of the present flanged fuel cell and combustion tool locating structure has been shown and described, it will be appreciated by those skilled in the art that changes and modifications may be made thereto without departing from the invention in its broader aspects and as set forth in the following claims.

What is claimed is:

1. A fuel cell constructed and arranged for use with a combustion tool including a cylinder head frame and a fuel cell chamber, said fuel cell comprising:
   an outer shell having a closed lower end and an open upper end;
   a closure crimped over said upper end and defining an opening for accommodating a reciprocating valve stem; and
   an adapter frictionally engaging said closure and including a flange extending radially beyond said outer shell and being configured for suspending said fuel cell in the fuel cell chamber by engagement of said flange with the cylinder head frame such that upon engagement, said fuel cell is solely supported in the fuel cell chamber by said engagement of the flange, and said fuel cell is vertically positioned in the fuel cell chamber with said lower end vertically below said closure.

2. The fuel cell of claim 1, wherein the tool cylinder head has a pair of spaced, parallel arms defining between them a fuel cell chamber, each of the arms defining a locating shelf on an inside surface, and said flange on said adapter is constructed and arranged for engaging the locating shelf.

3. The fuel cell of claim 1 wherein said adapter further includes a hub generally vertically reciprocally movable relative to an adapter body and having a first end dimensioned for frictionally accommodating a valve stem and defining an internal bore in fluid communication with the stem, and a second end engaging a pivoting receiver block for placing the valve stem and the receiver block in fluid communication, said hub being movable with the receiver block.

4. The fuel cell of claim 1 wherein said flange extends radially from an upper end of said adapter.

5. The fuel cell of claim 3 wherein said adapter further includes an actuator ring extending axially beyond an upper surface of said flange and defining an inlet to an inner chamber.

6. The fuel cell of claim 5 wherein said adapter further includes a hub generally vertically reciprocally movable relative to said adapter and having a first end dimensioned for frictionally accommodating said valve stem and defining an internal bore in fluid communication with said stem, said adapter having a curved flexible member secured within an inner adapter chamber and connected to said hub for accommodating said vertical reciprocating hub movement, said radially extending flange being located between said actuator ring and said flexible member.

7. The fuel cell of claim 3 wherein the tool includes a stem receiver block configured for matingly receiving said hub and having an internal passageway in fluid communication with said internal bore, and said hub is provided with a cylindrical projection at an upper end creating a face seal with a complementary portion of said internal passageway.

8. The adapter of claim 1 further including a hub having a vertical throughbore, connected at a lower end to the valve stem and having a generally bullet-shaped upper end with a tubular cylindrical extension.

9. A combustion tool, comprising:
   a housing enclosing a combustion power source including a cylinder head;
   said cylinder head provided with a frame having a pair of spaced, parallel arms defining between them a fuel cell chamber with a floor defined by said housing;

at least one of said arms defining a locating shelf on an inside surface;

a fuel cell configured for removable insertion into said fuel cell chamber and having an adapter;

said adapter including a flange configured for engaging said locating shelf for suspending said fuel cell in said fuel cell chamber so that a bottom of said fuel cell is free of said floor; and wherein said fuel cell is supported in said fuel cell chamber solely by said suspension from said arms.

10. The tool of claim 9, further including a fuel line in communication with said combustion chamber and having a free end connected to a stem receiver block having an internal passageway, and said adapter configured for connection to said stem receiver block and including a hub configured for matingly engaging said block and having a cylindrical extension projecting from an upper end for forming a seal with said stem receiver block.

11. The tool of claim 10, wherein the stem receiver block defines an internal passageway, and said cylindrical extension is constructed and arranged so that said formed seal is a face seal with said stem receiver block.

12. A combustion tool, comprising:

a housing enclosing a combustion power source including a cylinder head, and having a pair of arms defining a fuel cell chamber, said arms each having a locating shelf;

said cylinder head defining a combustion chamber;

a fuel cell configured for removable insertion into said fuel cell chamber and having an outer shell having a closed lower end and an open upper end, a closure crimped over said upper end to form a peripheral ring, a retractable fuel cell valve stem and an adapter;

said adapter having an adapter body and including a radially extending flange configured for engaging said locating shelves for suspending said fuel cell in said fuel cell chamber so that a bottom of said fuel cell is free of a floor of said fuel cell chamber, said adapter frictionally engaging said closure using a combination of a radially extending gripping formation engaging said peripheral ring, an annual groove configured for tightly and complementarily engaging said peripheral ring, and a lip radially extending from said body and dimensioned to rest upon an upper surface of said peripheral ring; and a fuel line in communication with said combustion chamber and having a free end connected to a stem receiver block having an internal passageway, said adapter configured for connection to said stem receiver block and including a hub configured for matingly engaging said block and for forming a face seal with said stem receiver block, said hub having an internal bore for slidingly receiving said fuel cell valve stem, said stem receiver block configured for exerting an axial force on said hub for depressing said fuel cell valve stem.

13. The tool of claim 9 wherein said adapter flange is disk-shaped and each of said locating shelves is configured as a recess shaped to accommodate a portion of said flange.

14. A fuel cell constructed and arranged for use with a combustion tool including a cylinder head frame and a fuel cell chamber having a floor, said fuel cell comprising:

an outer shell having a closed lower end and an open upper end;

a closure crimped over said upper end to form a peripheral ring, and defining an opening for accommodating a reciprocating valve stem; and an adapter having a body and frictionally engaging said closure using a combination of a radially extending gripping formation engaging a lower region of said peripheral ring, an annual groove configured for tightly and complementarily engaging said peripheral ring, and a lip radially extending from said body and dimensioned to rest upon and overhang an apex of an upper surface of said peripheral ring, said adapter also including a radially extending flange configured for suspending said fuel cell in the fuel cell chamber solely by engagement of said flange with the cylinder head frame so that said adapter is oriented above a bottom of said fuel cell and said bottom of said fuel cell is free of the floor of the fuel cell chamber.

15. The fuel cell of claim 14 wherein said adapter further includes a flange extending radially beyond said outer shell and being configured for suspending said fuel cell in the fuel cell chamber.

* * * * *